(12) United States Patent
Niemi et al.

(10) Patent No.: US 11,882,519 B2
(45) Date of Patent: *Jan. 23, 2024

(54) REREGISTRATION TO SLICES WITH MAPPED S-NSSAIS ALONE IN 5G SYSTEM

(71) Applicant: MediaTek Singapore Pte. Ltd., Singapore (SG)

(72) Inventors: Marko Niemi, Oulu (FI); Jaakko Sitomaniemi, Oulu (FI)

(73) Assignee: MediaTek Singapore Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 17/568,982

(22) Filed: Jan. 5, 2022

(65) Prior Publication Data

US 2022/0132411 A1 Apr. 28, 2022

Related U.S. Application Data

(63) Continuation of application No. 16/929,440, filed on Jul. 15, 2020, now Pat. No. 11,246,089.

(Continued)

(51) Int. Cl.
*H04W 48/18* (2009.01)
*H04W 8/08* (2009.01)
(Continued)

(52) U.S. Cl.
CPC ............ *H04W 48/18* (2013.01); *H04W 8/08* (2013.01); *H04W 60/00* (2013.01); *H04W 84/042* (2013.01)

(58) Field of Classification Search
CPC ....... H04W 48/18; H04W 60/00; H04W 8/08; H04W 84/04; H04W 84/042;
(Continued)

(56) References Cited

U.S. PATENT DOCUMENTS

| 11,246,089 | B2* | 2/2022 | Niemi et al. | .......... H04W 48/18 |
| 2018/0270877 | A1* | 9/2018 | Lee et al. | .............. H04W 76/10 |

(Continued)

FOREIGN PATENT DOCUMENTS

WO   WO 2018/093168 A1   5/2018

OTHER PUBLICATIONS

Extended European Search Report dated Nov. 26, 2020 in European Patent Appiication No. 20185969.1, 9 pages (Continued)

*Primary Examiner* — Meless N Zewdu
(74) *Attorney, Agent, or Firm* — Oblon, McClelland, Maier & Neustadt, L.L.P.

(57) ABSTRACT

A method of registering to slices with mapped S-NSSAI alone in a 5GS is described. The method can include, upon a UE entering a VPLMN, the UE having a first PDN connection or a first PDU session that is to be transferred to the VPLMN and associated with a first HPLMN S-NSSAI, determining whether the UE has a first VPLMN S-NSSAI applicable in the VPLMN corresponding to the first HPLMN S-NSSAI. If not, a registration request message can be transmitted to the VPLMN. The registration request message can include the first HPLMN S-NSSAI as a first mapped S-NSSAI for indicating a slice of the VPLMN to which the UE intends to register.

17 Claims, 9 Drawing Sheets

US 11,882,519 B2
Page 2

Related U.S. Application Data

(60) Provisional application No. 62/887,048, filed on Aug. 15, 2019, provisional application No. 62/886,440, filed on Aug. 14, 2019.

(51) Int. Cl.
*H04W 60/00* (2009.01)
*H04W 84/04* (2009.01)

(58) Field of Classification Search
CPC ......... H04W 36/0011; H04W 36/0055; H04W 36/14; H04W 88/06; H04W 88/00; H04W 88/02; H04W 88/08; H04W 8/087; H04W 8/10; H04W 8/12; H04W 8/14; H04W 48/02; H04W 48/04; H04W 48/20; H04W 76/00; H04W 76/10; H04W 76/11; H04W 76/15; H04W 76/16; H04W 88/005; H04W 88/18; H04W 36/00; H04W 36/0022; H04W 48/00; H04W 48/17; H04W 64/00; H04W 80/00; H04W 80/02; H04W 80/04; H04W 80/045; H04W 80/10; H04W 8/20; H04W 8/16; H04W 8/06; H04W 8/02; H04W 8/065; H04L 67/14
See application file for complete search history.

(56) References Cited

U.S. PATENT DOCUMENTS

| | | | |
|---|---|---|---|
| 2018/0324577 A1* | 11/2018 | Faccin et al. | H04W 8/06 |
| 2018/0368061 A1 | 12/2018 | Yu et al. | |
| 2019/0029065 A1* | 1/2019 | Park et al. | H04W 76/18 |
| 2019/0159157 A1 | 5/2019 | Gupta | |
| 2019/0174449 A1 | 6/2019 | Shan et al. | |
| 2019/0200285 A1* | 6/2019 | Velev et al. | H04W 48/18 |
| 2019/0313468 A1* | 10/2019 | Talebi Fard et al. | H04W 76/12 |
| 2020/0107250 A1 | 4/2020 | So | |
| 2020/0137552 A1 | 4/2020 | Park et al. | |
| 2020/0236528 A1 | 7/2020 | Lee et al. | |
| 2020/0267781 A1 | 8/2020 | Lee et al. | |
| 2020/0304983 A1 | 9/2020 | Zhu et al. | |
| 2020/0359271 A1 | 11/2020 | Lee et al. | |
| 2020/0413244 A1 | 12/2020 | Park et al. | |
| 2021/0076318 A1 | 3/2021 | Zang et al. | |

OTHER PUBLICATIONS

"Inclusion of HPLMN S-NSSAIs only" MediaTek Inc, SA WG2 Meeting #133, S2-1905207, vol. SA WG2, No. Reno, XP051720716, May 7, 2019, 5 pages.

"Inclusion of HPLMN S-NSSAIs only" MediaTek Inc, CT WG1 Meeting #119, C1-194664, vol. CT WG1, No. Wroclaw, XP051763286, Aug. 19, 2019, 5 pages.

Combined Taiwanese Office Action and Search Report dated May 18, 2021 in Taiwanese Patent Application No. 109126647 (with English translation of Category of Cited Documents), 10 pages.

Indian Office Action dated Aug. 19, 2021 in Indian Application No. 2020240300484, with English translation, 5 pgs.

Chinese Office Action dated May 26, 2023 in Chinese Application No. 202010765926.5, 9 pgs.

"Discussion on how to provide only mapped S-NSSAI of HPLMN to VPLMN", 3GPP TSG CT WG1 Meeting #115, Montreal (Canada), Feb. 25-Mar. 1, 2019, C1-191142, 3 pgs.

"Inclusion of HPLMN S-NSSAIs only", MediaTek Inc., CT WG1 Meeting #119, Aug. 26-30, 2019, Wroclaw, Poland, C1-194664, (revision of C1-19nnnn), 5 pgs.

\* cited by examiner

REREGISTRATION TO SLICES WITH MAPPED S-NSSAIS ALONE IN 5G SYSTEM

INCORPORATION BY REFERENCE

This present application claims the benefit of U.S. patent application Ser. No. 16/929,440, "Registration to Slices with Mapped S-NSSAIs Alone in 5G System" filed Jul. 15, 2020, which claims the benefit of U.S. Provisional Application No. 62/886,440, "Delivery of Mapped S-NSSAI(s) Alone" filed on Aug. 14, 2019, and No. 62/887,048, "Delivery of Mapped S-NSSAI(s) Alone" filed on Aug. 15, 2019. The disclosures of the prior applications are incorporated herein by reference in their entirety.

TECHNICAL FIELD

The present disclosure relates to wireless communications, and specifically relates to network slicing in a fifth generation (5G) system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Fifth generation (5G) network architecture developed by the 3rd Generation Partnership Project (3GPP) supports network slicing. For example, a common physical infrastructure can be partitioned into multiple slices of logical networks. Different network slices can have different supported features and network function optimizations, and thus can be adapted to different use cases. A specific network slice can be identified by a parameter called S-NSSAI, short for "single network slice selection assistance information". An S-NSSAI can include two portions: a slice/service type (SST) indicating an expected network slice behavior in terms of features and services, and optionally, a slice differentiator (SD) that complements the SST to differentiate among multiple network slices of a same slice/service type.

SUMMARY

Aspects of the disclosure provide a method of registering to slices with mapped single network slice selection assistance information (S-NSSAI) alone in a 5G system (5GS). The method can include, upon a user equipment (UE) entering a visited public land mobile network (VPLMN), the UE having a first packet data network (PDN) connection or a first protocol data unit (PDU) session that is to be transferred to the VPLMN and associated with a first home public land mobile network (HPLMN) S-NSSAI, determining whether the UE has a first VPLMN S-NSSAI applicable in the VPLMN corresponding to the first HPLMN S-NSSAI. In response to the UE not having the first VPLMN S-NSSAI applicable in the VPLMN corresponding to the first HPLMN S-NSSAI, a registration request message can be transmitted to register to a slice of the VPLMN for transferring the first PDN connection or the first PDU session to the VPLMN. The registration request message can include the first HPLMN S-NSSAI as a first mapped S-NSSAI for indicating the slice of the VPLMN to which the UE intends to register for transferring the first PDN connection or the first PDU session.

In an embodiment, the first HPLMN S-NSSAI is included in a requested mapped network slice selection assistance information (NSSAI) information element (IE). In an embodiment, the first PDN connection is established in S1 mode when the UE operates in a single registration mode, and the UE is performing an intersystem change from S1 mode to N1 mode to the VPLMN. In another embodiment, for the first PDU session that is to be transferred to the VPLMN, the UE is performing mobility from N1 mode to N1 mode from another VPLMN to the VPLMN. In a further embodiment, for the first PDU session that is to be transferred to the VPLMN, the UE is performing mobility from N1 mode to N1 mode from the HPLMN to the VPLMN.

In an embodiment, in response to the UE not having any S-NSSAI applicable in the VPLMN, the requested mapped NSSAI IE does not include any S-NSSAIs. In an embodiment, the requested mapped NSSAI IE does not include any S-NSSAI applicable in the VPLMN. In an embodiment, the UE has a second VPLMN S-NSSAI applicable in the VPLMN for a second PDN connection or a second PDU session that is to be transferred to the VPLMN and associated with a second HPLMN S-NSSAI. The registration request message further includes a requested NSSAI IE that includes (1) the second VPLMN S-NSSAI applicable in the VPLMN for indicating a slice to which the UE intends to register for transferring the second PDN connection or the second PDU session, and (2) the second HPLMN S-NSSAI as a second mapped S-NSSAI corresponding to the second VPLMN S-NSSAI applicable in the VPLMN.

An embodiment of the method can further include receiving a registration accept message including an allowed NSSAI IE that includes an allowed S-NSSAI for the slice of the VPLMN to which the UE intends to register and the mapped S-NSSAI corresponding to the allowed S-NSSAI, and associating the allowed S-NSSAI and first mapped S-NSSAI with a PDU session that is established in the VPLMN and corresponds to the first PDN connection or the first PDU session.

Aspects of the disclosure further provide an apparatus including circuitry. The circuitry is configured to, upon a UE entering a VPLMN, the UE having a first PDN connection or a first PDU session that is to be transferred to the VPLMN and associated with a first HPLMN S-NSSAI, determine whether the UE has a first VPLMN S-NSSAI applicable in the VPLMN corresponding to the first HPLMN S-NSSAI. In response to the UE not having the first VPLMN S-NSSAI applicable in the VPLMN corresponding to the first HPLMN S-NSSAI, the circuitry can further transmit a registration request message to register to a slice of the VPLMN for transferring the first PDN connection or the first PDU session to the VPLMN. The registration request message can include the first HPLMN S-NSSAI as a first mapped S-NSSAI for indicating the slice of the VPLMN to which the UE intends to register for transferring the first PDN connection or the first PDU session.

Aspects of the disclosure further provide a non-transitory computer-readable medium storing instructions implementing the method of registering to slices with mapped S-NSSAI alone in a 5GS.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
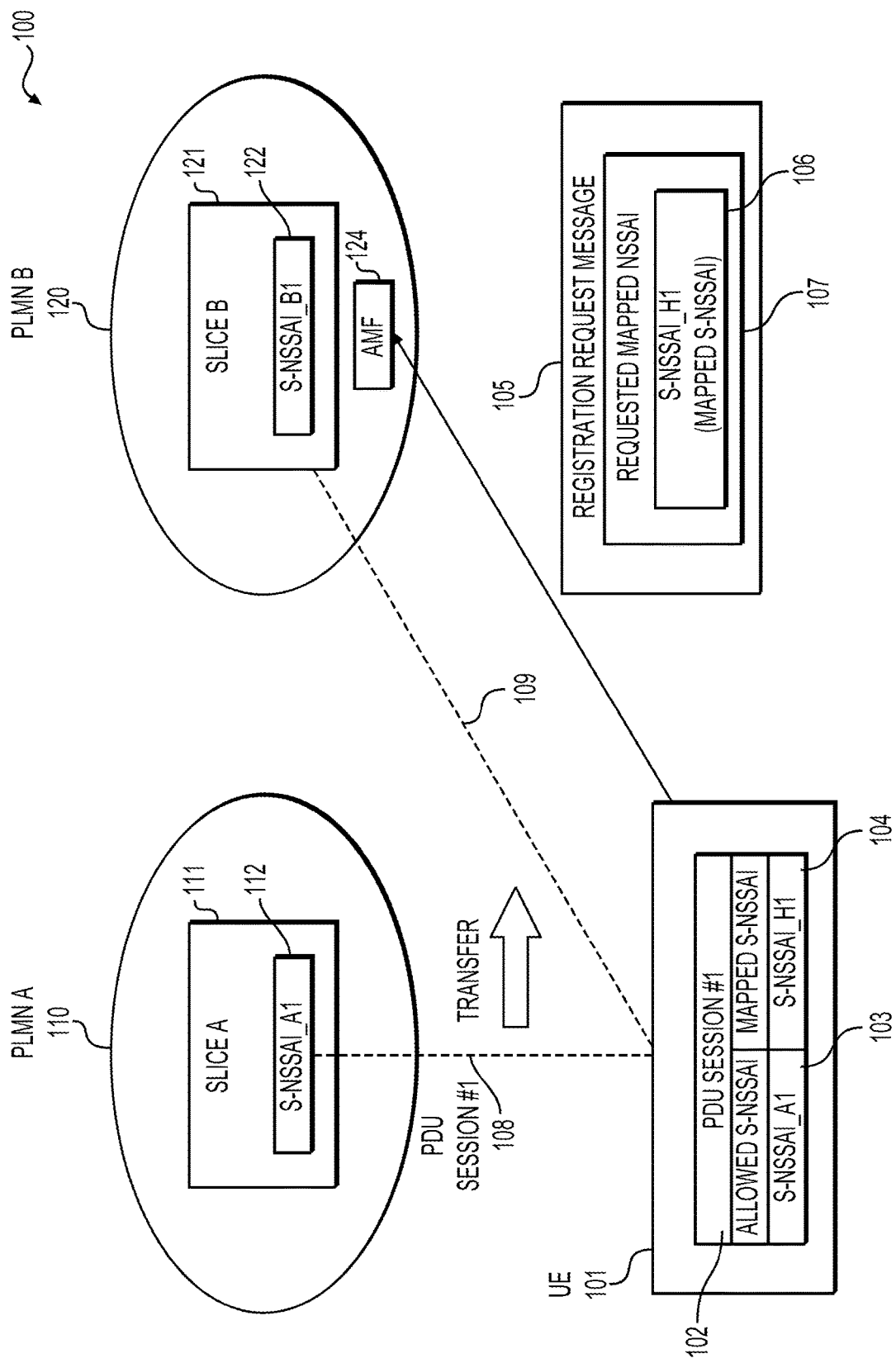
FIG. 1 shows a process 100 of transferring a protocol data unit (PDU) session 108 of a user equipment (UE) 101 between two public land mobile networks (PLMNs) 110 and 120 according to an embodiment of the disclosure.

FIG. 1 shows a process 100 of transferring a protocol data unit (PDU) session 108 of a user equipment (UE) 101 between two public land mobile networks (PLMNs) 110 and 120 according to an embodiment of the disclosure. The PLMN 110 is denoted by PLMN A, while the PLMN 120 is denoted by PLMN B as shown in FIG. 1. The PLMNs 110/120 can each be a fifth generation system (5GS) operating according to communication standards specified by the 3rd Generation Partnership Project (3GPP). The PLMNs 110/120 can each be a visited PLMN (VPLMN) with respect to a home PLMN (HPMN) (not shown) of the UE 101 in the FIG. 1 example.

The PLMNs 110/120 can support network slicing. For example, common physical resources in the PLMN 110 or 120 can be partitioned into multiple network slices. Different network slices can have different supported features and network function optimizations, and thus can be used for different applications at the UE 101. A specific network slice can be identified by a parameter called S-NSSAI, short for "single network slice selection assistance information". An S-NSSAI can include two portions: a slice/service type (SST) indicating an expected network slice behavior in terms of features and services, and optionally, a slice differentiator (SD) that complements the SST to differentiate among multiple network slices of a same slice/service type. A set of one or more S-NSSAIs is called an NSSAI.

The PLMN 110 can configure the UE 101 with a configured NSSAI applicable to the PLMN 110. For example, when the UE 101 enters the PLMN 110 (e.g., after powered on or due to mobility), the UE 101 may register to the PLMN 110 by sending a registration request message to an access and mobility management function (AMF) (not shown) in the PLMN 110. The registration request message may include a requested NSSAI indicating a set of S-NSSAIs the UE 101 intends to register to. As this is the first time the UE 101 enters the PLMN 110, the UE 101 is not aware of any S-NSSAIs applicable in the PLMN 110. Accordingly, the UE 101 may use S-NSSAIs from a default configured NSSAI provided by the HPLMN. In response, the PLMN 110 can provide the configured NSSAI in a registration accept message transmitted to the UE 101.

The configured NSSAI can include a set of S-NSSAIs indicating slices in the PLMN 110 that the UE 101 can use. In addition, the configured NSSAI can include mapped S-NSSAIs each corresponding to a respective S-NSSAI in the configured NSSAI. A mapped S-NSSAI can be one of subscribed S-NSSAIs for the HPLMN and mapped to an S-NSSAI of a VPLMN in case of a roaming scenario. For example, operators of the HPLMN and the PLMN 110 can have a roaming agreement. Based on the roaming agreement, the PLMN 110 can map S-NSSAIs applicable in the PLMN 110 to HPLMN S-NSSAIs applicable in the HPLMN.

Accompanying the configured NSSAI, the PLMN 110 can provide an allowed NSSAI in the registration accept message. The allowed NSSAI can indicate S-NSSAIs of slices the UE 101 is currently allowed to use (e.g., the allowed NSSAI is applicable to a set of specific tracking areas). Similarly, for each S-NSSAI in the allowed NSSAI, a corresponding mapped S-NSSAI (a HPLMN) can be provided.

While entering the PLMN 110, after becoming registered to the PLMN 110, assuming the UE 101 is powered on, the UE 101 may transmit a PDU session establishment request message to establish a new PDU session, such as the PDU session 108 (shown as PDU session #1 in FIG. 1). For example, an S-NSSAI 103, denoted by S-NSSAI_A1 in FIG. 1, can be selected from the allowed NSSAI, and included in the PDU session establishment request message. The S-NSSAI 103 can indicate a desired slice 111 to which the UE 101 intends to register, for example, for a specific application in the UE 101. The slice 111 is denoted by Slice A and is identified by S-NSSAI_A1 112. Additionally, a mapped S-NSSAI 104 (denoted S-NSSAI_H1) corresponding to the S-NSSAI 103 can also be included in the PDU session establishment request message. In response to receiving the PDU session establishment request message, the PDU session 108 can be established in the slice 111 of the PLMN 110.

At this stage, the PDU session 108 is established traversing the slice 111 in the PLMN 110. S-NSSAI information 102 associated with the PDU session 108 is stored at the UE 101 that includes the allowed S-NSSAI_A1 103 applicable in the VPLMN 110, and the corresponding mapped S-NSSAI_H1 104 applicable in the HPLMN of the UE 101. In a next stage, the UE 101 enters the PLMN 120, and the PDU session 108 is transferred from the PLMN 110 to the PLMN 120.

For example, the UE 101 may initiate a registration procedure (e.g., mobility registration update) by transmitting a registration request message 105 to an AMF 124 in the PLMN 120. The registration request message 105 can include a requested NSSAI to name a set of slices to which the UE 101 intends to register for application(s) in the UE 101. If the UE 101 has visited the PLMN 120 before, and was provided with a configured NSSAI and an allowed NSSAI, the UE 101 would be aware of identifiers (S-NS-SAIs) of slices of the PLMN 120 as well as mapped S-NSSAIs corresponding to the S-NSSAIs applicable in the PLMN 120. The UE 101 may accordingly select members of the requested NSSAI from the configured NSSAI and the allowed NSSAI. The mapped S-NSSAIs of the corresponding selected S-NSSAIs are associated with active PDU sessions at the UE 101.

However, in the FIG. 1 example, the UE 101 can be unaware of the slice identifiers of the slices of the PLMN 120 (and information of mapping to the corresponding mapped S-NSSAIs). Accordingly, to indicate requested S-NSSAIs for transferring PDU sessions (e.g., the PDU session 108), the UE 101 can include a set of mapped S-NSSAIs (e.g., the mapped S-NSSAI 104(106)) in the registration request message 105 without indicating corresponding S-NSSAIs applicable in the PLMN 120.

A set of mapped S-NSSAIs (without corresponding S-NSSAIs applicable in the PLMN 120) in the registration request message 105 is called a requested mapped NSSAI 107. Thus, when no S-NSSAIs of the PLMN 120 are available for a set of intended slices, the requested mapped NSSAI 107 is used in the registration request message for indicating the set of intended slices in the PLMN 120.

It is noted that, in some examples, when no S-NSSAIs of the PLMN 120 are available (configured) to the UE 101 for identifying a set of intended slices, the requested mapped NSSAI IE 107 does not include any S-NSSAIs.

It is noted that, in other examples where the UE 101 once visited the PLMN 120, it is possible that a subset of all mapped S-NSSAIs known at the UE 101 may have corresponding S-NSSAIs applicable in the PLMN 120. The mapping between those mapped S-NSSAIs and corresponding S-NSSAIs of the PLMN 120 can be recorded at the UE 101. In such a scenario, for transferring PDU sessions to the PLMN 120, a registration request message may include both a requested NSSAI explicitly naming intended slices and a requested mapped NSSAI indirectly naming intended slices.

In FIG. 1 example, similarly, the operator of the PLMN 120 may have a roaming agreement with the counterpart of the HPLMN. As a result, the PLMN 120 can maintain a mapping between S-NSSAIs applicable in the PLMN 120 and S-NSSAIs subscribed in the HPLMN. When the AMF 124 receives the mapped S-NSSAI 106 included in the registration request message 105, the AMF 124 may consult the information regarding the mapping between S-NSSAIs applicable in the PLMN 120 and S-NSSAIs applicable in the HPLMN, and determine an S-NSSAI 122 applicable in the PLMN 120 corresponding to the mapped S-NSSAI 106. The S-NSSAI 122 can identify a slice 121 (denoted as slice B) in the PLMN 120. In a similar manner, for other mapped S-NSSAIs in the requested mapped NSSAI 107, corresponding S-NSSAIs applicable in the PLMN 120 can also be determined.

In an example, the PLMN 120 may additionally check with the HPLMN to verify whether the received mapped S-NSSAIs in the requested mapped NSSAI 107 are included in the subscribed S-NSSAIs for the HPLMN. The AMF 124 itself or in cooperation with a network slice selection function (NSSF) can then determine an allowed NSSAI indicating slices the UE 101 is allowed to use. The allowed NSSAI can include the S-NSSAI 122 identifying the slice 121 for transferring the PDU session 108 to the PLMN 120. The allowed NSSAI can include a subset or all of the slices corresponding to the requested mapped NSSAI 107. A registration accept message can be transmitted from the AMF 124 to the UE 101 carrying the allowed NSSAI. In addition, in the allowed NSSAI, mapped S-NSSAIs corresponding to each allowed S-NSSAIs can also be included.

Upon receiving the allowed S-NSSAI 122, the UE 101 can initiate a PDU session establishment request that indicates the allowed S-NSSAI 122 to which the UE 101 intends to register for transferring the PDU session 108. The PDU session establishment request can also carry the corresponding mapped S-NSSAI 104(107). The AMF 124 may forward the PUD session establishment request to a session management function (SMF) in the slice 121. In case of a local break out session to be established for transferring the PDU session 108, the SMF can coordinate a user plane function (UPF) in the slice 121 to establish the local break out session. In case of a home routing session is to be used for transferring the PDU session 108, the SMF in the slice 121 may cooperate with a SMF in the HPLMN to establish the home touting session. As a result of the process 100, the PDU session 108 served by the slice 111 in the PLMN 110 can be transferred to a new session 109 served by the slice 121 in the PLMN 120.

FIGS. 2-7 show examples of PDU session or packet data network (PDN) connection transferring processes taking place in different scenarios. In each of the FIGS. 2-5 examples, a PDU session active at a UE is transferred when the UE is performing mobility from N1 mode to N1 mode from a source VPLMN to a target VPLMN. In the FIG. 6 example, a PDU session active at a UE is transferred when the UE is performing mobility from N1 mode to N1 mode from a HPLMN to a VPLMN. In the FIG. 7 example, a PDN connection established in S1 mode when a UE is operating in a single-registration mode is transferred when the UE is performing an inter-system change from S1 mode to N1 mode to a VPLMN. Regarding the S1 mode or N1 mode, when a UE is served by a 5GS, the UE can communicate with an AMF in the 5GS to exchange control signaling via an N1 interface. Thus, the UE under the serving of a 5GS is said to be operating in N1 mode. In contrast, when a UE is served by a Evolved Packet System (EPS), the UE can communicate with a mobility management entity (MME) or a serving gateway (S-GW) via an S1 interface to exchange control signaling. Thus, the UE under the serving of a EPS is said to be operating in S1 mode.

Figure 2:
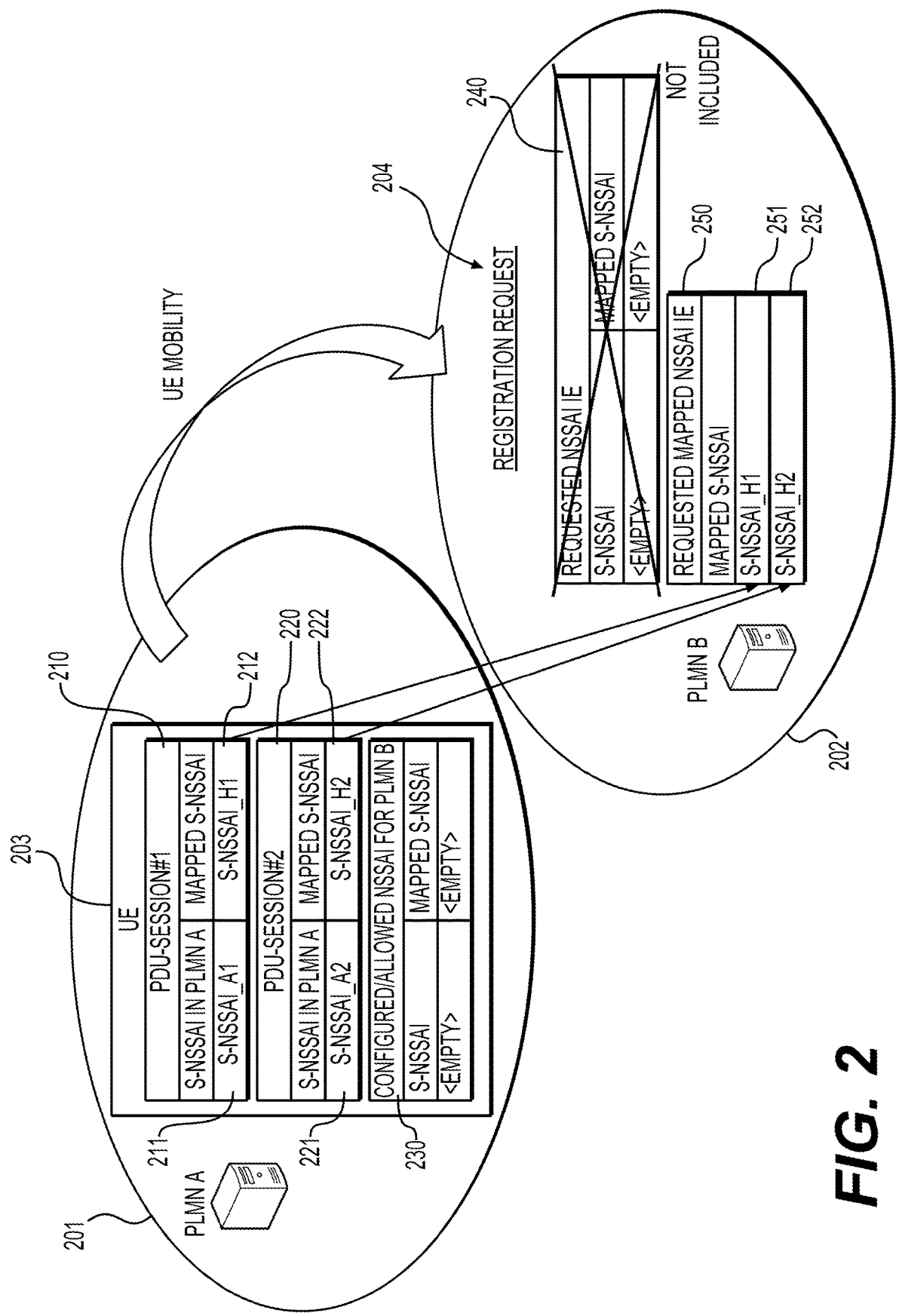
FIG. 2 shows an example process where a UE 203 performs mobility from N1 mode to N1 mode from a first PLMN 201 (shown as PLMN A) to a second PLMN 202 (shown as PLMN B).

In FIG. 2, a UE 203 performs mobility from N1 mode to N1 mode from a first PLMN 201 (shown as PLMN A) to a second PLMN 202 (shown as PLMN B). Both the PLMNs 201-202 can be VPLMNs with respect to a HPLMN of the UE 203. Both the PLMNs 201-202 can be 5GSs (or each include a 5GS) and support network slicing.

Initially, the UE 203 can be registered with the PLMN 201 and operate in radio resource control (RRC) idle mode or RRC inactive mode. The UE 203 can have two active PDU sessions 210-220 (denoted by PDU-session #1 and PDU-session #2, respectively). The PDU session 210 is associated with an S-NSSAI 211 (denoted S-NSSAI_A1), and is established in a slice identified by the S-NSSAI 211. The S-NSSAI 211 is mapped to a HPLMN S-NSSAI 212 (denoted by S-NSSAI_H1). The PDU session 220 is associated with an S-NSSAI 221 (denoted by S-NSSAI_A2), and is established in a slice identified by the S-NSSAI 221. The S-NSSAI 221 is mapped to a HPLMN S-NSSAI 222 (denoted by S-NSSAI_H2). The associations between the active PDU sessions 210 or 220 and the corresponding S-NSSAI 211 or 221 applicable in the PLMN 201 and the mapped S-NSSAI 212 or 222 can be stored at the UE 203.

In addition, the UE 203 has not visited the PLMN 202 before, and is unaware of any information of configured or allowed NSSAI applicable in the PLMN 202. Accordingly, no configured or allowed NSSAI for the PLMN 202 is stored in a table 230 at the PLMN 201.

The UE 203 can enter the coverage of the PLMN 202, and establish, for example, a radio resource control (RRC) connection with a base station (e.g., a gNb) of the PLMN 202. The UE 203 can then transmit a registration request message 204 to the PLMN 202 to initiate a registration procedure for mobile registration update. For purpose of transferring the active PDU sessions 210 and 220, because no S-NSSAI applicable in the PLMN 202 is available to the UE 203, the UE 203 can use the two mapped S-NSSAIs 212/222 to indicate slices to which the UE 203 intends to register. Thus, the registration request message 204 can include the two mapped S-NSSAIs 212/222 (labelled with numerals 251/252) in a requested mapped NSSAI contained in a requested mapped NSSAI information element (IE) 250. No requested NSSAI IE 240 is included in the registration request message.

Figure 3:
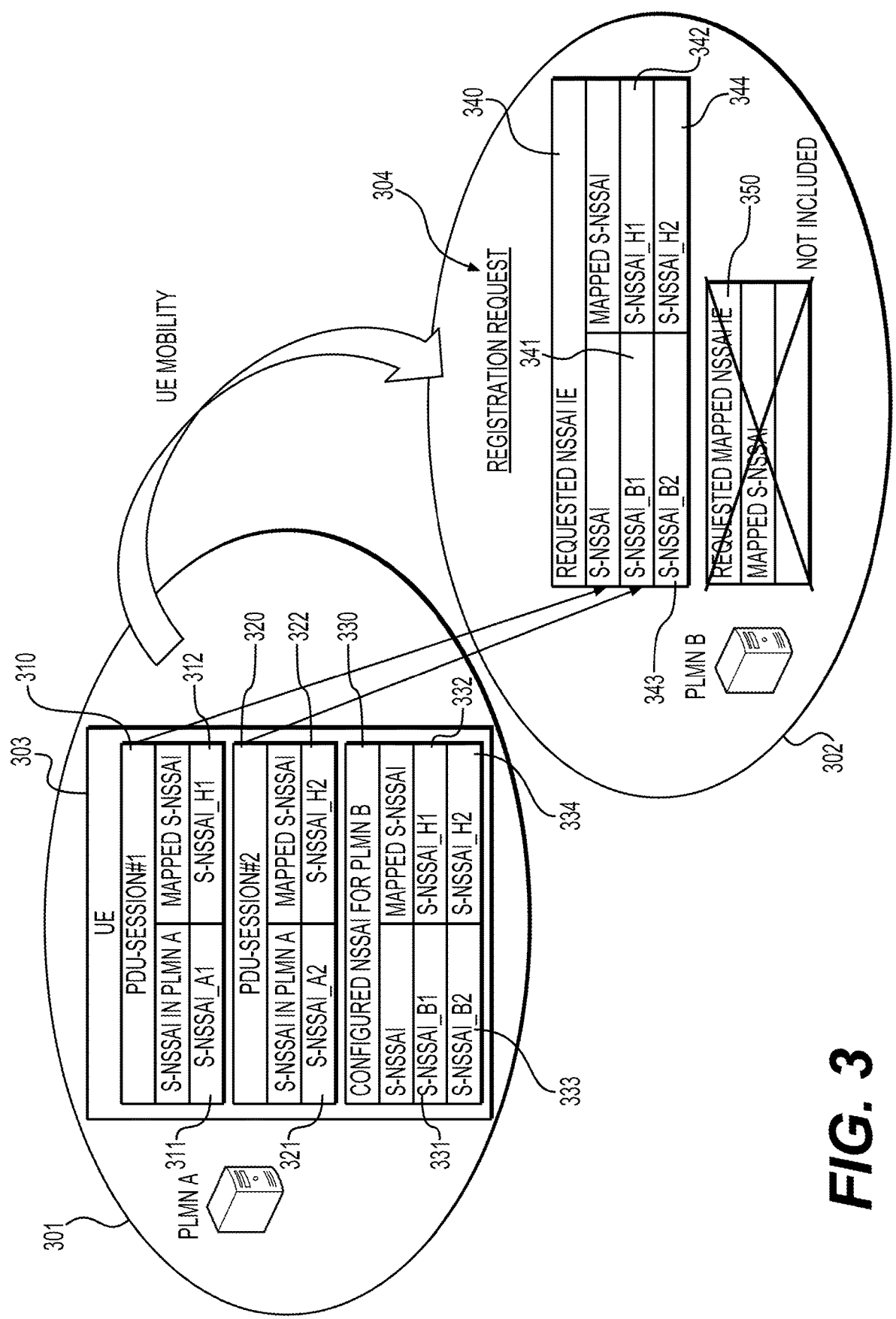
FIG. 3 shows an example process where a UE 303 performs mobility from N1 mode to N1 mode from a first PLMN 301 (shown as PLMN A) to a second PLMN 302 (shown as PLMN B).

In FIG. 3, a UE 303 performs mobility from N1 mode to N1 mode from a first PLMN 301 (shown PLMN A) to a second PLMN 302 (shown as PLMN B). Both the PLMNs 301-302 can be VPLMNs with respect to a HPLMN of the UE 303. Both the PLMNs 301-302 can be 5GSs (or each include a 5GS) and support network slicing.

Similar to the FIG. 2 scenario, the UE can have two active PDU sessions 310-320 (denoted by PDU-session #1 and PDU-session #2, respectively). The PDU session 310 is associated with an S-NSSAI 311 (denoted by S-NSSAI_A1) applicable in the PLMN 301 and a mapped S-NSSAI 312 (denoted by S-NSSAI_H1). The PDU session 320 is associated with an S-NSSAI 321 (denoted S-NSSAI_A2) applicable in the PLMN 301 and a mapped S-NSSAI 322 (denoted by S-NSSAI_H2).

Different from the FIG. 2 scenario, the UE 303 can have visited the PLMN 302 before, and is provided with a configured NSSAI applicable in the PLMN 302. As shown, a table 330 stores two configured S-NSSAIs 331 and 333 applicable in the PLMN 302 each mapped to a HPLMN S-NSSAI 332(312) and 334(322), respectively.

Accordingly, upon entering the PLMN 302, based on information stored in the table 330, the UE 303 can use the configured (or allowed) S-NSSAIs 331 and 333 for the PLMN 302 to indicate slices for transferring the active PDU sessions 310-320. Specifically, a registration request message 304 can be transmitted that carries a requested NSSAI including the S-NSSAIs 341(331) and 343(333), and the corresponding mapped S-NSSAIs 342(312) and 344(332). The requested NSSAI is contained in a requested NSSAI IE 340. No requested mapped NSSAI IE 350 is included in the registration request message 304.

Figure 4:
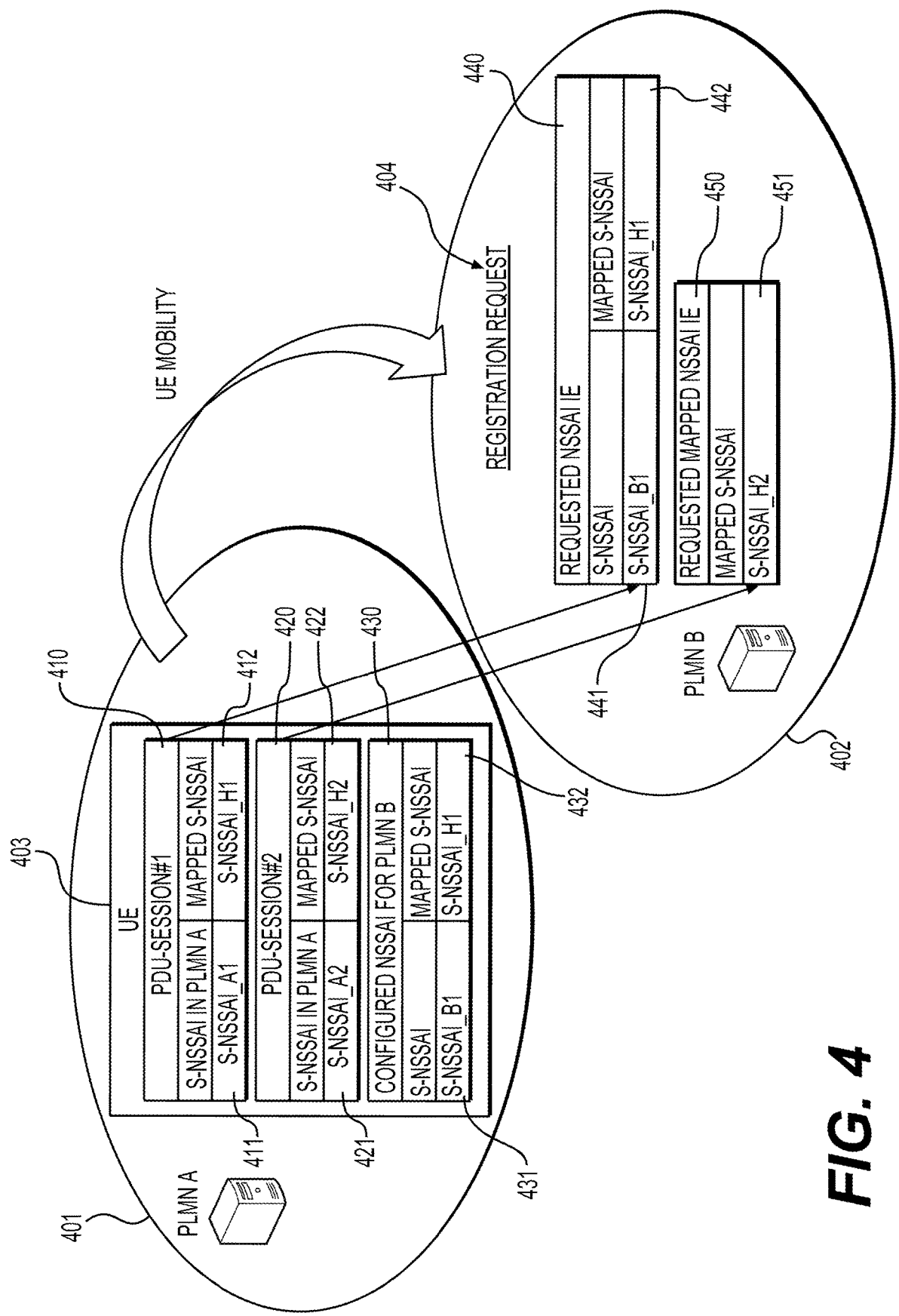
FIG. 4 shows an example process where a UE 403 performs mobility from N1 mode to N1 mode from a first PLMN 401 (denoted by PLMN A) to a second PLMN 402 (denoted by PLMN B).

In FIG. 4, a UE 403 performs mobility from N1 mode to N1 mode from a first PLMN 401 (denoted by PLMN A) to a second PLMN 402 (denoted by PLMN B). Both the PLMNs 401-402 can be VPLMNs with respect to a HPLMN of the UE 403. Both the PLMNs 401-402 can be 5GSs (or each include a 5GS) and support network slicing.

Similar to the FIG. 2 scenario, the UE can have two active PDU sessions 410-420 (denoted by PDU-session #1 and PDU-session #2, respectively). The PDU session 410 is associated with an S-NSSAI 411 (denoted S-NSSAI_A1) applicable in the PLMN 401 and a mapped S-NSSAI 412 (denoted by S-NSSAI_H1). The PDU session 420 is associated with an S-NSSAI 421 (denoted S-NSSAI_A2) applicable in the PLMN 401 and a mapped S-NSSAI 422 (denoted by S-NSSAI_H2).

Different from the FIG. 2 scenario, the UE 403 can have visited the PLMN 402 before, and is provided with a configured NSSAI applicable in the PLMN 402. As shown, a table 430 stores a configured S-NSSAI 431 applicable in the PLMN 402 that is mapped to a HPLMN S-NSSAI 432(412). However, the UE 403 is unaware of an S-NSSAI applicable in the PLMN 402 corresponding to the mapped S-NSSAI 422 associated with the PDU session 420.

Accordingly, upon entering the PLMN 402, for transferring the active PDU session 410, based on information stored in the table 430, the UE 403 can use the configured S-NSSAI 431 for the PLMN 402 to indicate a slice the UE 403 intends to register to. For transferring the active PDU session 420, the UE 403 can use mapped S-NSSAI 422 to indicate a slice.

Specifically, a registration request message 404 can be transmitted that include both a requested NSSAI IE 440 and a requested mapped NSSAI IE 450. The requested NSSAI IE 440 can contain the S-NSSAI 441(431) applicable in the PLMN 402, and the corresponding mapped S-NSSAI 442 (412). The requested mapped NSSAI IE 450 can contain the mapped S-NSSAI 451 (442) corresponding to the PDU session 420 without indicating a corresponding S-NSSAI applicable in the PLMN 402.

Figure 5:
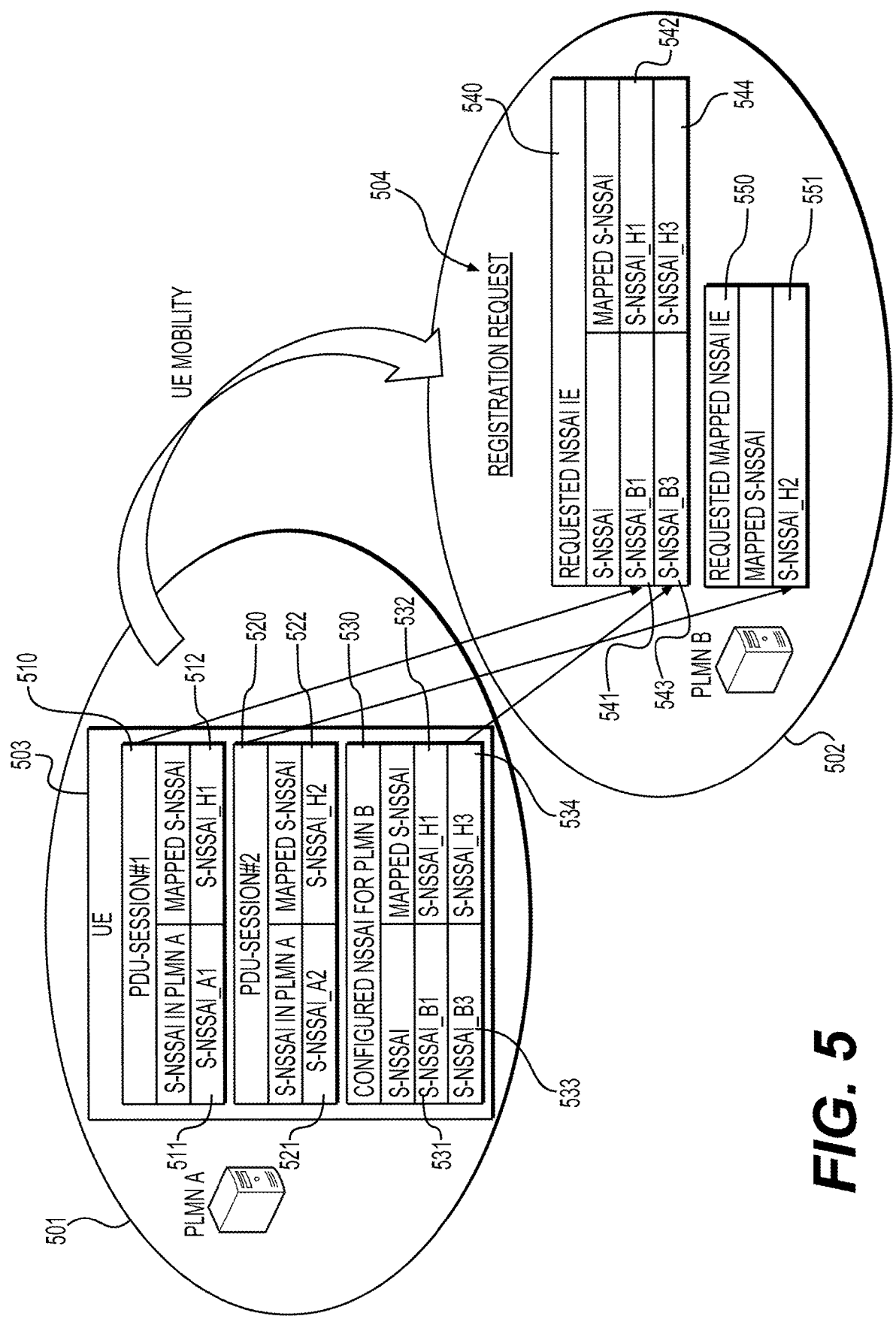
FIG. 5 shows an example process where a UE 503 performs mobility from N1 mode to N1 mode from a first PLMN 501 (denoted by PLMN A) to a second PLMN 502 (denoted by PLMN B).

In FIG. 5, a UE 503 performs mobility from N1 mode to N1 mode from a first PLMN 501 (denoted by PLMN A) to a second PLMN 502 (denoted by PLMN B). Both the PLMNs 501-502 can be VPLMNs with respect to a HPLMN of the UE 503. Both the PLMNs 501-502 can be 5GSs (or each include a 5GS) and support network slicing.

Similar to the FIG. 2 scenario, the UE can have two active PDU sessions 510-520 (denoted by PDU-session #1 and PDU-session #2, respectively). The PDU session 510 is associated with an S-NSSAI 511 (denoted S-NSSAI_A1) applicable in the PLMN 501 and a mapped S-NSSAI 512 (denoted by S-NSSAI_H1). The PDU session 520 is associated with an S-NSSAI 521 (denoted S-NSSAI_A2) applicable in the PLMN 501 and a mapped S-NSSAI 522 (denoted by S-NSSAI_H2).

Similar to the FIG. 4 scenario, the UE 503 can have visited the PLMN 502 before, and is provided with a configured NSSAI applicable in the PLMN 502. As shown, a table 530 stores a first configured S-NSSAI 531 applicable in the PLMN 502 that is mapped to the HPLMN S-NSSAI 532(512). In addition, a second configured S-NSSAI 533 applicable in the PLMN 502 is stored in the table 530, and mapped to a HPLMN S-NSSAI 534. The mapped S-NSSAI 534 is not associated with any active PDU sessions at the UE 503. Similar to the FIG. 4 scenario, the UE 503 is unaware of an S-NSSAI applicable in the PLMN 502 corresponding to the mapped S-NSSAI 522 associated with the PDU session 520.

Upon entering the PLMN 502, the UE 503 can transmit a registration request message 504. The registration request message 504 can include both a requested NSSAI IE 540 and a requested mapped NSSAI IE 550. For transferring the PDU session 520, the requested mapped NSSAI IE 550 can contain the mapped S-NSSAI 551 corresponding to the PDU session 520 without indicating a corresponding S-NSSAI applicable in the PLMN 502. For transferring the PDU session 510, the requested NSSAI IE can contain the S-NSSAI 541(531) applicable in the PLMN 502, and the corresponding mapped S-NSSAI 542(512).

In addition, to indicate a new slice for establishing a new PDU session in the PLMN 502, the requested NSSAI IE 540 can contain the S-NSSAI 543(533) and the corresponding mapped S-NSSAI 544(534). For example, upon entering the PLMN 502, in response to a request from a specific application at the UE 503, the UE 503 may want to register to the new slice identified by the S-NSSAI 543. When the registration to the slice of S-NSSAI 543 is allowed, the UE 503 can subsequently initiate a PDU session establishment request with the S-NSSAI 543 to establish the new PDU session.

Figure 6:
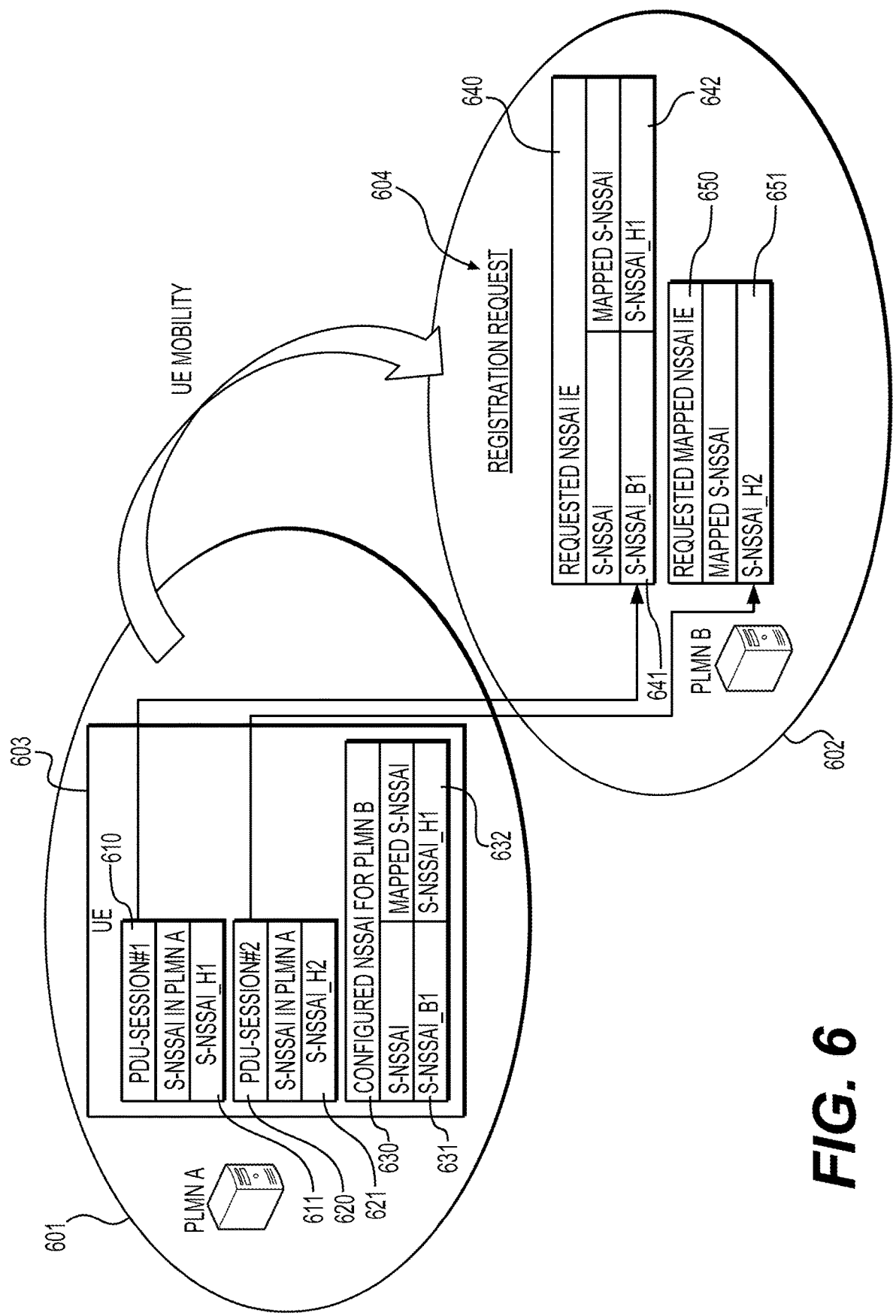
FIG. 6 shows an example process where a UE 603 performs mobility from N1 mode to N1 mode from a first PLMN 601 (denoted by PLMN A) to a second PLMN 602 (denoted by PLMN B).

In FIG. 6, a UE 603 performs mobility from N1 mode to N1 mode from a first PLMN 601 (denoted by PLMN A) to a second PLMN 602 (denoted by PLMN B). Both the PLMNs 601-602 can be 5GSs (or each include a 5GS) and support network slicing. Different from the FIGS. 2-5 examples, the first PLMN 601 can be a HPLMN of the UE 603. The second PLMN 602 can be a VPLMN.

Similar to the FIG. 2 scenario, the UE can have two active PDU sessions 610-620 (denoted by PDU-session #1 and PDU-session #2, respectively). The PDU session 610 is associated with an S-NSSAI 611 (denoted by S-NSSAI_H1). The PDU session 620 is associated with an S-NSSAI 621 (denoted by S-NSSAI_H2). As there is no roaming taking place at a HPLMN, information of mapped S-NSSAIs is not associated with the PDU sessions 610 or 620.

The UE 603 can have visited the PLMN 602 before, and is provided with a configured NSSAI applicable in the PLMN 602. As shown, a table 630 stores a configured S-NSSAI 631 applicable in the PLMN 602 that is mapped to a HPLMN S-NSSAI 632(611). However, the UE 603 is unaware of an S-NSSAI applicable in the PLMN 602 corresponding to the HPLMN S-NSSAI 621 associated with the PDU session 620.

Upon the UE 603 entering the PLMN 602, a registration request message 604 can be transmitted that include both a requested NSSAI IE 640 and a requested mapped NSSAI IE 650. The requested NSSAI IE 640 can contain the S-NSSAI 641(631) applicable in the PLMN 602, and the corresponding HPLMN S-NSSAI 642(611). The requested mapped NSSAI IE 650 can contain the HPLMN S-NSSAI 651(621) corresponding to the PDU session 620 without indicating a corresponding S-NSSAI applicable in the PLMN 602.

Figure 7:
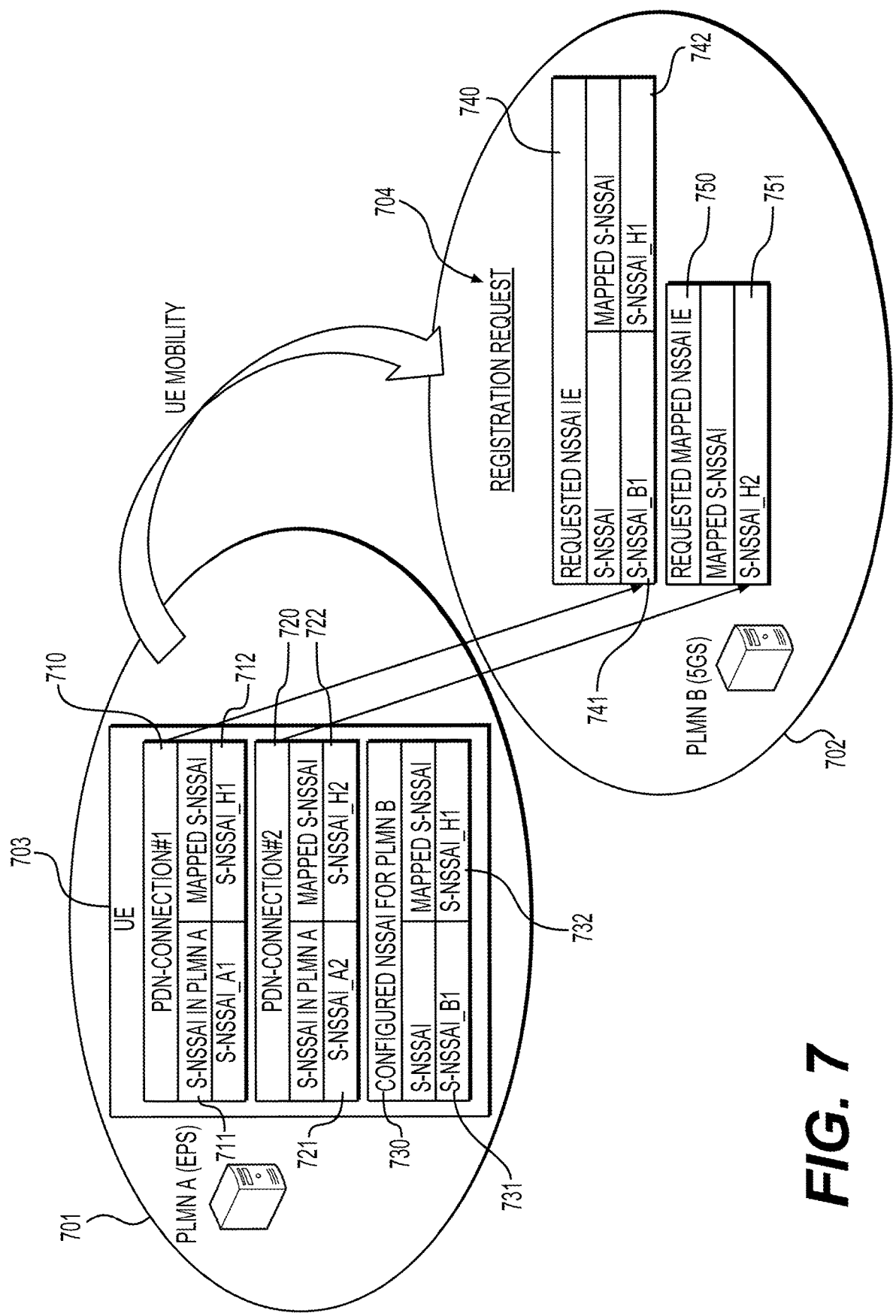
FIG. 7 shows an example process where a UE 703 performs intersystem change from S1 mode to N1 mode from a EPS of a first PLMN 701 (denoted by PLMN A) to a 5GS of a second PLMN 702 (denoted by PLMN B).

In FIG. 7, a UE 703 performs intersystem change from S1 mode to N1 mode from a EPS of a first PLMN 701 (denoted by PLMN A) to a 5GS of a second PLMN 702 (denoted by PLMN B). Both the PLMNs 701-702 can be VPLMNs with respect to a HPLMN of the UE 703. Both the PLMNs 701-702 can each include a 5GS and support network slicing over the respective 5GSs.

The UE 703 can be registered to the EPS of the PLMN 701 (e.g., operating in a single registration mode), and operate in S1 mode. The UE 703 can have two active PDN connections 710-720 (denoted by PDN-connection #1 and PDN-connection #2, respectively). The PDN connection 710 is associated with an S-NSSAI 711 (denoted S-NSSAI_A1) applicable in the 5GS of the PLMN 701 and a corresponding mapped S-NSSAI 712 (denoted by S-NSSAI_H1). The PDN connection 720 is associated with an S-NSSAI 721 (denoted S-NSSAI_A2) applicable in the 5GS of the PLMN 701 and a corresponding mapped S-NSSAI 722 (denoted by S-NSSAI_H2).

For example, the UE 703 previously performed an intersystem change from N1 mode to S1 mode from the 5GS of the PLMN 701 to the EPS of the PLMN 701, and two previous PDU sessions in the 5GS of the PLMN 701 were transferred to be the current PDN connections 710-720 in the EPS of the PLMN 701. Information of the S-NSSAIs 711/721 and the mapped S-NSSAIs 712/722 were previously associated with the previous PDU sessions in the 5GS of the PLMN 701, and were stored at the UE 703 after the intersystem change from the 5GS to the EPS took place in the PLMN 701.

The UE 703 can have visited the 5GS of the PLMN 702 before, and is provided with a configured NSSAI applicable in the PLMN 702. As shown, a table 730 stores a configured S-NSSAI 731 applicable in the PLMN 702 that is mapped to a HPLMN S-NSSAI 732(712). However, the UE 703 is unaware of an S-NSSAI applicable in the PLMN 702 corresponding to the mapped S-NSSAI 722 associated with the PDN connection 720.

Accordingly, upon the intersystem change from the EPS of the PLMN 701 to the 5GS of the PLMN 702, for transferring the active PDN connection 710, based on information stored in the table 730, the UE 703 can use the configured S-NSSAI 731 for the PLMN 702 to indicate a slice the UE 703 intends to register to. For transferring the active PDN connection 720, the UE 703 can use the mapped S-NSSAI 722 to indicate an intended slice.

Specifically, a registration request message 704 can be transmitted that include both a requested NSSAI IE 740 and a requested mapped NSSAI IE 750. The requested NSSAI IE 740 can contain the S-NSSAI 741(731) applicable in the PLMN 702, and the corresponding mapped S-NSSAI 742 (712). The requested mapped NSSAI IE 750 can contain the mapped S-NSSAI 751 (722) corresponding to the PDN connection 720 without indicating a corresponding S-NSSAI applicable in the PLMN 702.

Figure 8A:
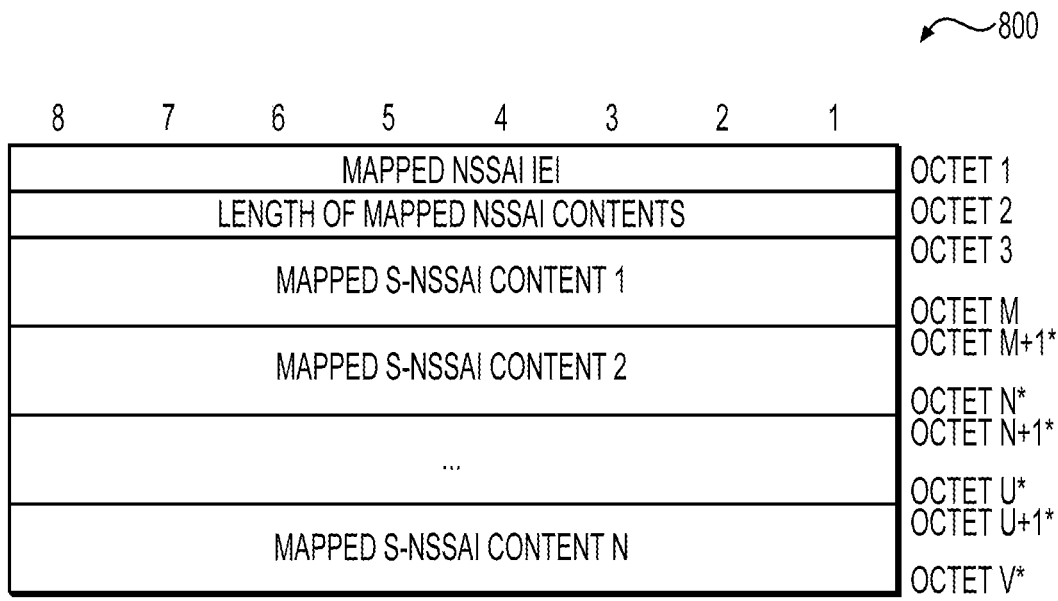
FIG. 8A shows an example of a mapped network slice selection assistance information (NSSAI) information element (IE) 800 according to an embodiment of the disclosure.

FIG. 8A shows an example of a mapped NSSAI IE 800 according to an embodiment of the disclosure. The mapped NSSAI IE 800 can be used in a scenario when a UE has a PDN connection or PDU session to transfer to a VPLMN, and the PDN connection or PDU session is only associated with a HPLMN S-NSSAI and has no associated S-NSSAI applicable in the VPLMN. A mapped NSSAI IE can be included in a registration request message to indicate the HPLMN S-NSSAI (mapped S-NSSAI) to the VPLMN.

As shown, the mapped NSSAI IE 800 can include a field of a mapped NSSAI IE identifier (mapped NSSAI IEI) occupying a first 8 bits, a field of a length of mapped NSSAI contents occupying a second 8 bits, and a sequence of fields of mapped S-NSSAI contents numbered from 1 to n. In an example, the mapped NSSAI IE 800 is a type 4 information element with a minimum length of 4 octets and a maximum length of 42 octets.

Figure 8B:
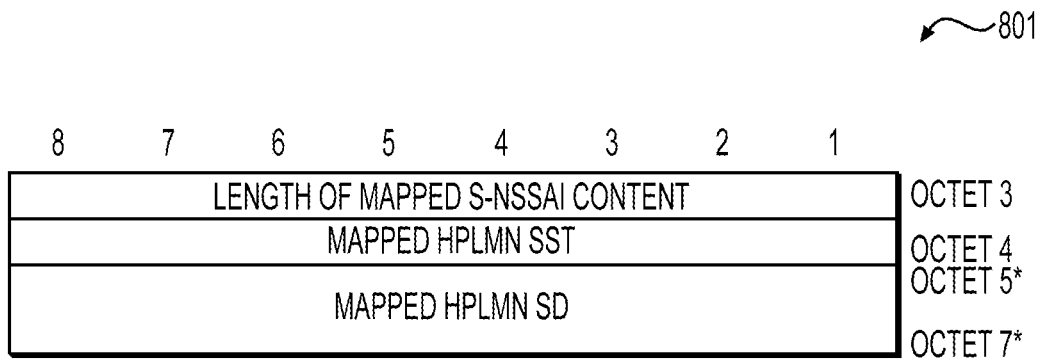
FIG. 8B shows an example of a mapped single NSSAI (S-NSSAI) content 801.

FIG. 8B shows an example of a mapped S-NSSAI content 801. As shown, the mapped S-NSSAI content 801 can include a field of a length of the mapped S-NSSAI content 801 occupying a first 8 bits, a field of a mapped HPLMN SST occupying a second 8 bits, and an optional field of a mapped HPLMN SD.

Figure 9:
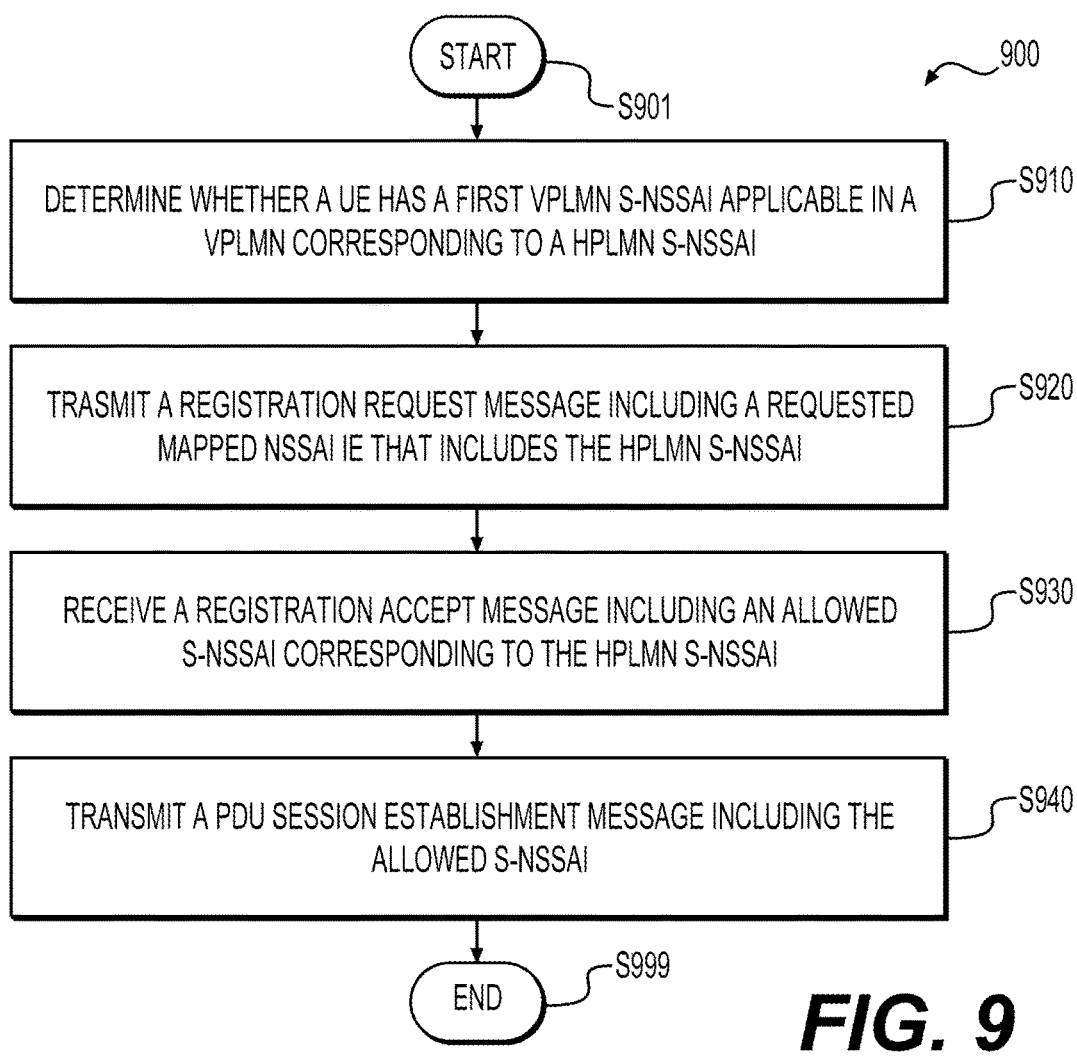
FIG. 9 shows a process 900 of transferring a packet data network (PDN) connection or a PDU session to a visited PLMN (VPLMN) according to an embodiment of the disclosure.

FIG. 9 shows a process 900 of transferring a PDN connection or a PDU session to a VPLMN according to an embodiment of the disclosure. The process 900 can start from S901 and proceeds to S910.

At S910, a UE enters a second PLMN from a first PLMN. The second PLMN can be a visited PLMN with respect to a HPLMN of the UE. The UE can have a first active PDN connection or a first active PDU session established in the first PLMN that is to be transferred from the first PLMN to the second PLMN. The first PDN connection or the first PDU session can be associated with a first HPLMN S-NSSAI. It can be determined whether the UE has a first VPLMN S-NSSAI applicable in the second PLMN to which the first HPLMN S-NSSAI is mapped.

In a first case, the first PDN connection can be established in S1 mode when the UE operates in a single registration mode in a EPS of the first PLMN. The UE is performing an intersystem change from S1 mode to N1 mode to the second PLMN. In a second case, the first PLMN can be another VPLMN with respect to a HPLMN of the UE. The UE is performing mobility from N1 mode to N1 mode from the other VPLMN to the second PLMN. In a third case, the first PLMN can be the HPLMN of the UE. The UE is performing mobility from N1 mode to N1 mode from the other VPLMN to the second PLMN.

At S920, in response to the UE not having the first VPLMN S-NSSAI applicable in the second PLMN corresponding to the first HPLMN S-NSSAI, a registration request message can be transmitted to register to a slice of the second PLMN for transferring the first PDN connection or the first PDU session to the second PLMN. The registration request message can include a requested mapped NSSAI IE that includes the first HPLMN S-NSSAI (as a first mapped S-NSSAI) for indicating the slice of the second PLMN to which the UE intends to register for transferring the first PDN connection or the first PDU session. The requested mapped NSSAI IE can include only mapped S-NSSAI(s) without any S-NSSAI applicable in the second PLMN.

In an example, the UE can have (or store) a second VPLMN S-NSSAI applicable in the second PLMN for a second PDN connection or a second PDU session that is to be transferred to the second PLMN and associated with a second HPLMN S-NSSAI. In other words, the second VPLMN S-NSSAI is mapped with the second HPLMN S-NSSAI. Accordingly, the registration request message can further include a requested NSSAI IE that includes the second VPLMN S-NSSAI applicable in the second PLMN for indicating a slice to which the UE intends to register for transferring the second PDN connection or the second PDU session. The requested NSSAI IE can further include the second HPLMN S-NSSAI as a second mapped S-NSSAI corresponding to the second VPLMN S-NSSAI applicable in the second PLMN.

At S930, a registration accept message is received. The registration accept message can include an allowed NSSAI IE that includes an allowed S-NSSAI for the slice of the second PLMN to which the UE intends to register for transferring the first PDN connection or the first PDU session. The allowed NSSAI IE can further include the mapped S-NSSAI corresponding to the allowed S-NSSAI.

At S940, a PDU session establishment request message is transmitted. The PDU session establishment request message can include the allowed S-NSSAI received at S930 for establishing a PDU session corresponding the first PDN connection or the first PDU session. In an example, the UE associates the S-NSSAI and the first mapped S-NSSAI with a PDU session that is established in the VPLMN and corresponds to the first PDN connection or the first PDU session. The process 900 can proceed to S999, and terminate at S999.

Figure 10:
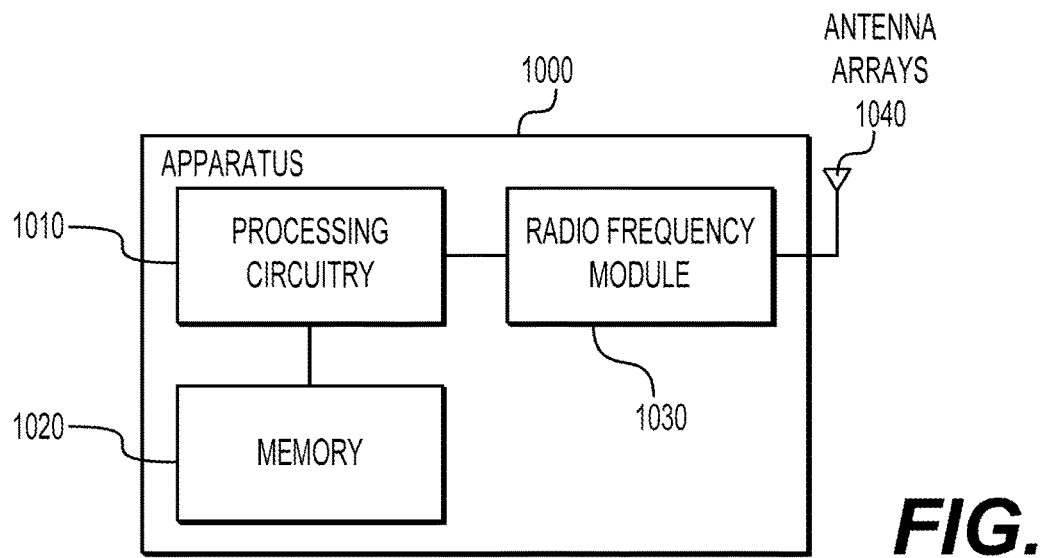
FIG. 10 shows an exemplary apparatus 1000 according to embodiments of the disclosure.

FIG. 10 shows an exemplary apparatus 1000 according to embodiments of the disclosure. The apparatus 1000 can be configured to perform various functions in accordance with one or more embodiments or examples described herein. Thus, the apparatus 1000 can provide means for implementation of mechanisms, techniques, processes, functions, components, systems described herein. For example, the apparatus 1000 can be used to implement functions of UEs, base stations, and elements of core networks in various embodiments and examples described herein. The apparatus 1000 can include a general purpose processor or specially designed circuits to implement various functions, components, or processes described herein in various embodiments. The apparatus 1000 can include processing circuitry 1010, a memory 1020, and optionally a radio frequency (RF) module 1030.

In various examples, the processing circuitry 1010 can include circuitry configured to perform the functions and processes described herein in combination with software or without software. In various examples, the processing circuitry 1010 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1010 can be a central processing unit (CPU) configured to execute program instructions to perform various functions and processes described herein. Accordingly, the memory 1020 can be configured to store program instructions. The processing circuitry 1010, when executing the program instructions, can perform the functions and processes. The memory 1020 can further store other programs or data, such as operating systems, application programs, and the like. The memory 1020 can include non-transitory storage media, such as a read only memory (ROM), a random access memory (RAM), a flash memory, a solid state memory, a hard disk drive, an optical disk drive, and the like.

In an embodiment, the RF module 1030 receives a processed data signal from the processing circuitry 1010 and converts the data signal to beamforming wireless signals that are then transmitted via antenna arrays 1040, or vice versa. The RF module 1030 can include a digital to analog converter (DAC), an analog to digital converter (ADC), a frequency up converter, a frequency down converter, filters and amplifiers for reception and transmission operations. The RF module 1030 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1040 can include one or more antenna arrays.

The apparatus 1000 can optionally include other components, such as input and output devices, additional or signal processing circuitry, and the like. Accordingly, the apparatus 1000 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   upon a user equipment (UE) entering a visited public land mobile network (VPLMN), the UE having a first protocol data unit (PDU) session that is associated with a first home public land mobile network (HPLMN) single network slice selection assistance information (S-NSSAI), determining whether the UE has a first VPLMN S-NSSAI applicable in the VPLMN corresponding to the first HPLMN S-NSSAI; and
   in response to the UE not having the first VPLMN S-NSSAI applicable in the VPLMN corresponding to the first HPLMN S-NSSAI, transmitting a registration request message to the VPLMN, the registration request message including the first HPLMN S-NSSAI as a first mapped S-NSSAI for indicating a slice of the VPLMN to which the UE intends to register.

2. The method of claim 1, wherein the first HPLMN S-NSSAI is included in a requested mapped network slice selection assistance information (NSSAI) information element (IE).

3. The method of claim 1, wherein for the first PDU session that is associated with the first HPLMN S-NSSAI, the UE is performing mobility from N1 mode to N1 mode from another VPLMN to the VPLMN.

4. The method of claim 1, wherein for the first PDU session that is associated with the first HPLMN S-NSSAI, the UE is performing mobility from N1 mode to N1 mode from the HPLMN to the VPLMN.

5. The method of claim 1, wherein in response to the UE not having any S-NSSAI applicable in the VPLMN, a requested mapped NSSAI IE in the registration request message does not include any S-NSSAIs.

6. The method of claim 1, wherein in response to the UE has a second VPLMN S-NSSAI applicable in the VPLMN for a second PDU session that is associated with a second HPLMN S-NSSAI, the registration request message further includes a requested NSSAI IE that includes (1) the second VPLMN S-NSSAI applicable in the VPLMN for indicating a slice to which the UE intends to register for transferring the second PDU session, and (2) the second HPLMN S-NSSAI as a second mapped S-NSSAI corresponding to the second VPLMN S-NSSAI applicable in the VPLMN.

7. The method of claim 1, further comprising:
   receiving a registration accept message including an allowed NSSAI IE that includes an allowed S-NSSAI for the slice of the VPLMN to which the UE intends to register and the first mapped S-NSSAI corresponding to the allowed S-NSSAI; and
   associating the allowed S-NSSAI and the first mapped S-NSSAI with a PDU session that is established in the VPLMN and corresponds to the first PDU session.

8. An apparatus, comprising circuitry configured to:
   upon a user equipment (UE) entering a visited public land mobile network (VPLMN), the UE having a first protocol data unit (PDU) session that is associated with a first home public land mobile network (HPLMN) single network slice selection assistance information (S-NSSAI), determine whether the UE has a first VPLMN S-NSSAI applicable in the VPLMN corresponding to the first HPLMN S-NSSAI; and
   in response to the UE not having the first VPLMN S-NSSAI applicable in the VPLMN corresponding to the first HPLMN S-NSSAI, transmit a registration request message to the VPLMN, the registration request message including the first HPLMN S-NSSAI as a first mapped S-NSSAI for indicating a slice of the VPLMN to which the UE intends to register.

9. The apparatus of claim 8, wherein the first HPLMN S-NSSAI is included in a requested mapped network slice selection assistance information (NSSAI) information element (IE).

10. The apparatus of claim 8, wherein for the first PDU session that is associated with the first HPLMN S-NSSAI, the UE is performing mobility from N1 mode to N1 mode from another VPLMN to the VPLMN, or from the HPLMN to the VPLMN.

11. The apparatus of claim 8, wherein in response to the UE not having any S-NSSAI applicable in the VPLMN, a requested mapped NSSAI IE in the registration request message does not include any S-NSSAIs.

12. The apparatus of claim 8, wherein in response to the UE has a second VPLMN S-NSSAI applicable in the VPLMN for a second PDU session that is associated with a second HPLMN S-NSSAI, the registration request message further includes a requested NSSAI IE that includes (1) the second VPLMN S-NSSAI applicable in the VPLMN for indicating a slice to which the UE intends to register for transferring the second PDU session, and (2) the second HPLMN S-NSSAI as a second mapped S-NSSAI corresponding to the second VPLMN S-NSSAI applicable in the VPLMN.

13. The apparatus of claim 8, wherein the circuitry is further configured to:
   receive a registration accept message including an allowed NSSAI IE that includes an allowed S-NSSAI for the slice of the VPLMN to which the UE intends to register and the mapped S-NSSAI corresponding to the allowed S-NSSAI; and
   associate the allowed S-NSSAI and first mapped S-NSSAI with a PDU session that is established in the VPLMN and corresponds to the first PDU session.

14. A non-transitory computer-readable medium storing instructions that, when executed by a processor, cause the processor to perform a method, the method comprising:
   upon a user equipment (UE) entering a visited public land mobile network (VPLMN), the UE having a first protocol data unit (PDU) session that is associated with a first home public land mobile network (HPLMN) single network slice selection assistance information (S-NSSAI), determining whether the UE has a first VPLMN S-NSSAI applicable in the VPLMN corresponding to the first HPLMN S-NSSAI; and in response to the UE not having the first VPLMN S-NSSAI applicable in the VPLMN corresponding to the first HPLMN S-NSSAI, transmitting a registration request message to the VPLMN, the registration request message including the first HPLMN S-NSSAI as a first mapped S-NSSAI for indicating a slice of the VPLMN to which the UE intends to register.

15. The non-transitory computer-readable medium of claim 14, wherein for the first PDU session that is associated with the first HPLMN S-NSSAI, the UE is performing mobility from N1 mode to N1 mode from another VPLMN to the VPLMN, or from the HPLMN to the VPLMN.

16. The non-transitory computer-readable medium of claim 14, wherein in response to the UE not having any S-NSSAI applicable in the VPLMN, a requested mapped NSSAI IE in the registration request message does not include any S-NSSAIs.

17. The non-transitory computer-readable medium of claim 14, wherein in response to the UE has a second VPLMN S-NSSAI applicable in the VPLMN for a second PDU session that is associated with a second HPLMN S-NSSAI, the registration request message further includes a requested NSSAI IE that includes (1) the second VPLMN S-NSSAI applicable in the VPLMN for indicating a slice to which the UE intends to register for transferring the second PDU session, and (2) the second HPLMN S-NSSAI as a second mapped S-NSSAI corresponding to the second VPLMN S-NSSAI applicable in the VPLMN.

* * * * *